D. D. JONES.
Nut-Lock.
No. 165,167.  Fig. 1.  Patented July 6, 1875.
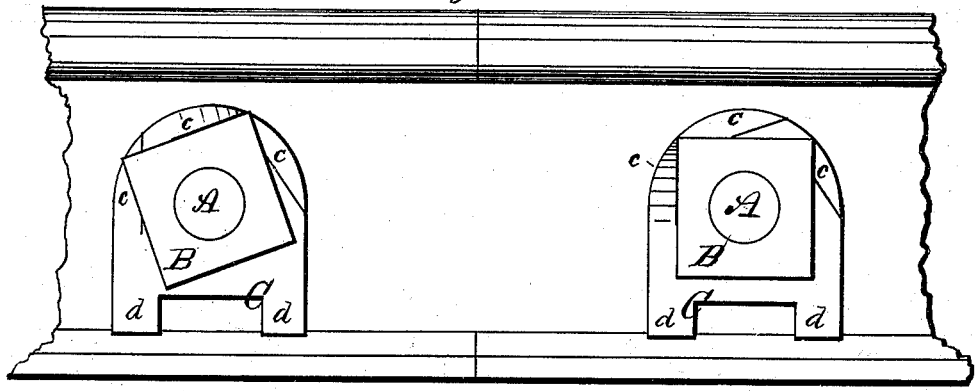
Fig. 2.
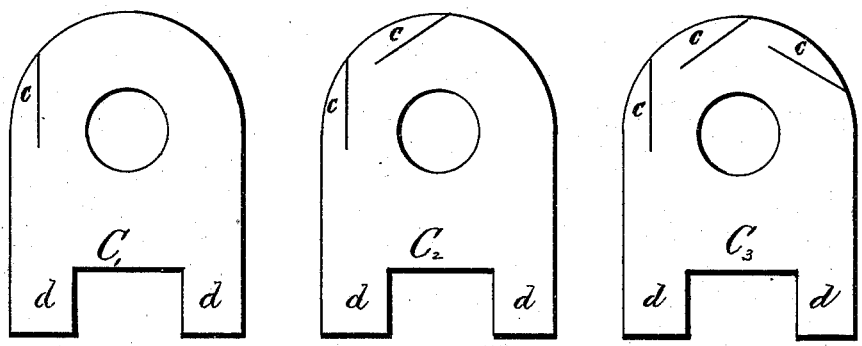
Witnesses  
F. A. Pollock  
A. Corcoran
David D. Jones Inventor  
Connolly Bros & McTighe Attorneys
N. PETERS, PHOTO-LITHOGRAPHER, WASHINGTON, D. C.

UNITED STATES PATENT OFFICE.

DAVID D. JONES, OF PITTSBURG, PENNSYLVANIA, ASSIGNOR OF ONE-HALF HIS RIGHT TO THOMAS B. EVANS, OF SAME PLACE.

IMPROVEMENT IN NUT-LOCKS

Specification forming part of Letters Patent No. 165,167, dated July 6, 1875; application filed April 6, 1875.

*To all whom it may concern:*

Be it known that I, DAVID D. JONES, of Pittsburg, in the county of Allegheny and State of Pennsylvania, have invented certain new and useful Improvements in Nut-Locks and Washers; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of rail-joint, showing nuts in locked position. Fig. 2 gives three styles of washer.

This invention relates to washers for locking nuts and bolts and the washer itself at the same time; and consists in a tempered-steel washer with cuts or slits so situated that their lines are perpendicular to the smallest diameter of the nut, which lines or cuts form tongues of metal, which, being tempered in a raised or upset position, spring up with their edges against the side of the nut, and may be made to lock at every quarter, eighth, or other fractional part of an integral revolution of the nut; and in slightly elongating one end of the washer, and forming it with two legs or extensions to abut against the flange or head of the rail, and be thereby prevented from turning with the nut, as well as to form an easy way of loosening the latter by simply bending these legs outwardly and away from the flange or head of the rail, when both nut and washer may be freely turned.

My object, then, is to provide a washer which will lock itself and furnish a ready, simple, and effectual lock for the nut or bolt, at the same time being easily removed without the use of any other tool than the ordinary wrench.

For these purposes I construct my washer as follows, reference being had to the drawings herewith:

I take a disk of metal, C, one end semicircular and the other elongated, and formed with two legs or extensions, $d$, to keep it from turning along with the nut. On the semicircular end I cut one or more slits perpendicular to the radius, and at a distance equal to the short radius of the nut. These slits form tongues $c$, so arranged, at will, that one will be in line with one side of the nut B at every quarter, eighth, sixteenth, or other partial revolution of the nut. These tongues are now sprung slightly outward and tempered. To lock the nut the washer is put on the bolt with its legs against the head or flange of the rail, after which the nut is tightened down and some one side brought in line with the inner edge of some one of the tongues $c$, when the latter instantly flies into position, with its edge abutting against the side of the nut, where it remains a steadfast lock or check, the legs of the washer keeping the latter from revolving with the nut. To loosen the nut the legs of the washer, being untempered, are simply bent away from the flange or head of the rail sufficiently to clear it, after which the washer and nut can be turned off the bolt.

The advantages of such a washer are, that it is instantly adjusted, acts automatically, is easily removed, is cheaply made, and is not destroyed by losing its elasticity, as it may then be used by bending the tongues out when necessary.

This washer may be made untempered, if so desired, in which case the tongues would be in the plane of the washer when not locking.

In the drawings, A is the bolt; B, the nut, and C the washer, with its tongues $c$ and legs $d$.

In the second figure three modifications in the number and position of the tongues are shown by $C^1$, $C^2$, and $C^3$, respectively, one, two, and three in number, and requiring, in the same order, one-quarter, one-eighth, and one-sixteenth revolution of the nut for locking.

Having described my invention, I claim—

The improved nut-locking washer, consisting of the spring-plate C, having the elastic oblique tongues $c$ sprung outwardly, as described, and having their inner edges perpendicular to the radius of the central opening, said plate being formed with the legs $d$, all as shown and specified.

In testimony that I claim the foregoing I have hereunto set my hand this 31st day of March, 1875.

DAVID D. JONES.

Witnesses:
T. J. MCTIGHE,
A. CORCORAN.